United States Patent
Sato et al.

(10) Patent No.: US 7,900,995 B2
(45) Date of Patent: Mar. 8, 2011

(54) VEHICLE BODY STRUCTURE

(75) Inventors: Koji Sato, Wako (JP); Hideyuki Okada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 135 days.

(21) Appl. No.: 12/331,665

(22) Filed: Dec. 10, 2008

(65) Prior Publication Data

US 2009/0146462 A1  Jun. 11, 2009

(30) Foreign Application Priority Data

Dec. 11, 2007  (JP) ................................ 2007-319532

(51) Int. Cl.
  *B62D 21/00*  (2006.01)
(52) U.S. Cl. ............ 296/187.1; 296/187.12; 296/193.09; 296/209; 296/203.02; 296/203.03; 280/784
(58) Field of Classification Search ............ 296/187.07, 296/187.1, 187.12, 193.05, 187.08, 193.09, 296/193.07, 198, 209, 203.02, 203.03, 187.09; 280/784; 180/312, 311
See application file for complete search history.

(56) References Cited

U.S. PATENT DOCUMENTS

| | | | | |
|---|---|---|---|---|
| 4,557,519 A * | 12/1985 | Matsuura | ...................... | 296/204 |
| 5,806,918 A * | 9/1998 | Kanazawa | ...................... | 296/204 |
| 5,839,776 A * | 11/1998 | Clausen et al. | .......... | 296/187.03 |
| 6,227,610 B1 * | 5/2001 | Iwatsuki et al. | .............. | 296/204 |
| 6,511,119 B2 * | 1/2003 | Takase et al. | ............. | 296/187.09 |
| 6,817,657 B2 * | 11/2004 | Watanabe et al. | ........ | 296/203.02 |
| 6,866,115 B2 * | 3/2005 | Miyasaka | ...................... | 180/311 |
| 7,025,412 B2 * | 4/2006 | Nakamura et al. | ....... | 296/193.07 |
| 7,188,893 B2 * | 3/2007 | Akasaka | ....................... | 296/204 |
| 7,469,957 B1 * | 12/2008 | Boettcher | ................. | 296/193.07 |
| 7,527,326 B2 * | 5/2009 | Egawa et al. | ............ | 296/193.07 |
| 7,614,684 B2 * | 11/2009 | Yasuhara et al. | ......... | 296/187.09 |
| 7,699,385 B2 * | 4/2010 | Kurata | .......................... | 296/204 |
| 2002/0153719 A1 * | 10/2002 | Taguchi | ........................ | 280/784 |
| 2010/0078969 A1 * | 4/2010 | Boettcher et al. | ........ | 296/193.09 |
| 2010/0117403 A1 * | 5/2010 | Kihara et al. | ............. | 296/203.02 |

FOREIGN PATENT DOCUMENTS

| | | | |
|---|---|---|---|
| JP | 02212280 A | * | 8/1990 |
| JP | 07-108956 | | 4/1995 |
| JP | 09-323666 | | 12/1997 |
| JP | 2007-045352 | | 2/2007 |

* cited by examiner

*Primary Examiner* — Jason S Morrow
(74) *Attorney, Agent, or Firm* — Rankin, Hill & Clark LLP

(57) ABSTRACT

A vehicle body structure includes at least one side sill and at least one outrigger, the at least one side sill being connected to the at least one outrigger, wherein the at least one side sill is made of an extruded material and has a front end portion protruding vehicle frontward from a connecting portion between the at least one side sill and the at least one outrigger. In the vehicle body structure, the front end of the side sill is disposed frontward from a front end of a side sill in a conventional vehicle body structure and the front end of the side sill is formed to be a part for receiving a front wheel.

10 Claims, 5 Drawing Sheets

VEHICLE BODY STRUCTURE

CROSS REFERENCE TO RELATED APPLICATIONS

This application claims the foreign priority benefit under 35 U.S.C. §119 of Japanese Patent Application No. 2007-319532 filed on Dec. 11, 2007, the disclosure of which is incorporated herein by reference.

BACKGROUND OF THE INVENTION

1. Field of the Invention

The present invention relates to a vehicle body structure capable of absorbing collision energy when a vehicle collides head-on.

2. Description of the Related Art

As a vehicle body structure that absorbs collision energy when a vehicle collides head-on, a vehicle body structure has conventionally been known in which load absorbing means formed of a honeycomb member or the like are fixed to a fender protector by welding or mechanical fastening in such a manner that the load absorbing means are disposed on the front and rear sides of the front wheel, respectively (refer to Unexamined Japanese Patent Application Publication No. 2007-45352). In the vehicle body structure, the load absorbing means on the rear side of the front wheel is arranged oppositely to a front end of a side sill. It is to be noted that in a conventional vehicle body structure, a side sill is connected to an outrigger at a front end side thereof and extends rearward of the vehicle body.

In the above vehicle body structure, when a vehicle undergoes an offset collision, the collision load deforms in order of a front bumper, a front part of a fender protector, the load absorbing means disposed on the front side of the front wheel, the front wheel, the load absorbing means disposed on the rear side of the front wheel, and a rear part of the fender protector, and reaches the front end of the side sill. Since the load absorbing means are provided on the front and rear sides of the front wheel respectively in the vehicle body structure, the collision load transmitted from the front bumper to the side sill is reduced in the vehicle body structure compared with vehicle body structures that do not include the load absorbing means.

In a conventional vehicle body structure (refer to Unexamined Japanese Patent Application Publication No. 2007-45352, for example), however, when a vehicle crashes in a high speed, the load absorbing means (honeycomb member or the like) may not fully absorb the collision load applied from a front bumper, so that a front wheel that has received the collision load may move backward. The front wheel that has been moved backward may deform a side sill as well as a floor panel that is located inside (vehicle inner side) of the side sill. In order to prevent the front wheel from moving backward, the side sill may be reinforced. However, if the side sill is reinforced, the weight of the vehicle body structure is disadvantageously increased.

SUMMARY OF THE INVENTION

The present invention has been made in an attempt to provide a lighter-weighted and higher rigidity vehicle body structure which enables to prevent a front wheel from moving backward even when a vehicle collides head-on in a high speed.

A first aspect of the present invention provides a vehicle body structure including at least one side sill and at least one outrigger, the at least one side sill being connected to the at least one outrigger, wherein the at least one side sill is made of an extruded material and has a front end portion protruding vehicle frontward from a connecting portion between the at least one side sill and the at least one outrigger.

Other features and advantages of the present invention will become more apparent from the following detailed descriptions of the invention when taken in conjunction with the accompanying drawings.

BRIEF DESCRIPTION OF THE DRAWINGS

FIG. 5 is a left side view that shows a front side of a vehicle when the vehicle having the vehicle body structure according to the embodiment collides head-on.

DETAILED DESCRIPTION OF THE INVENTION

Figure 1:
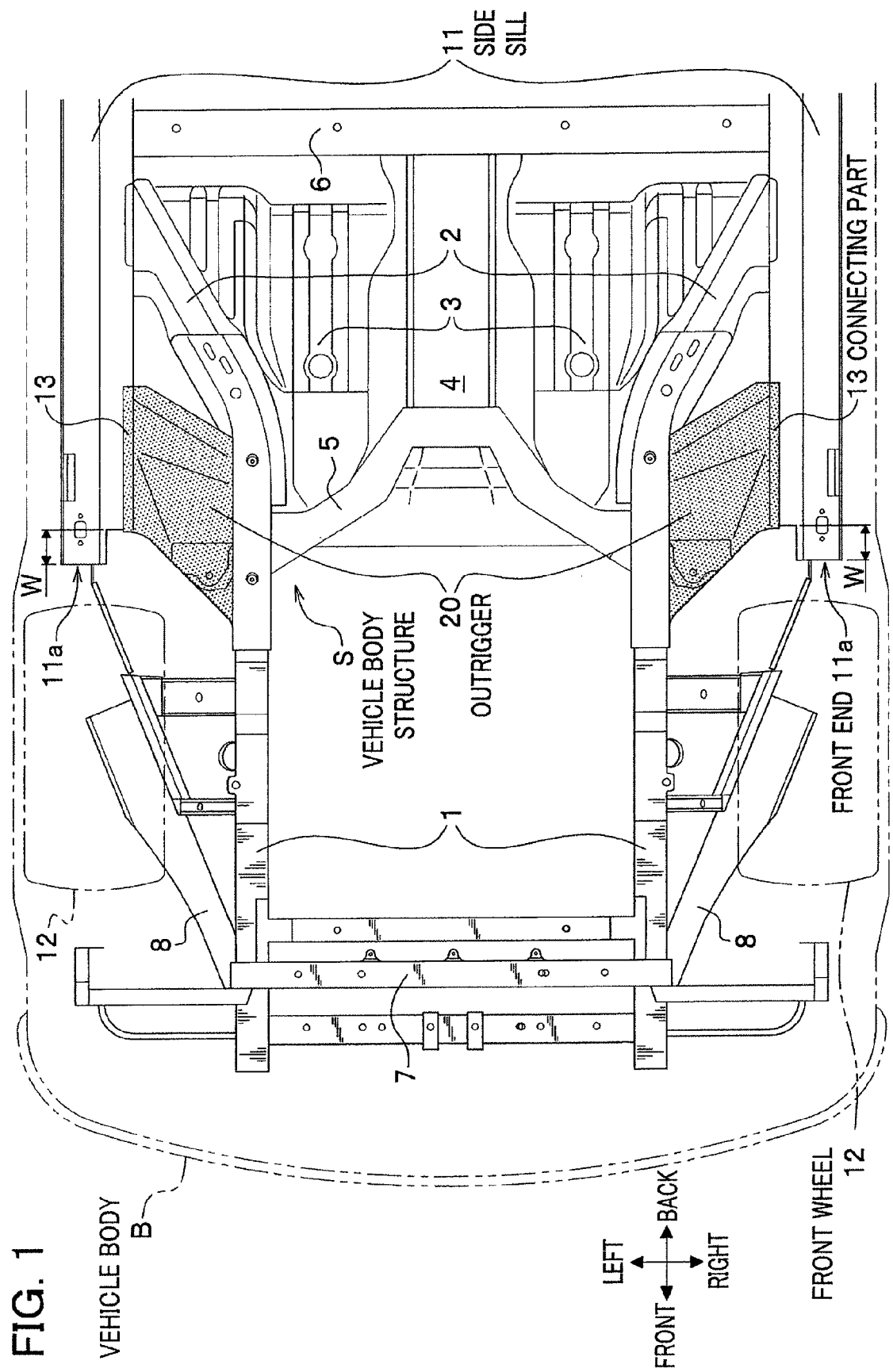
FIG. 1 is a diagram of a vehicle body structure according to an embodiment showing a front part of a vehicle seen from the under side of the vehicle.
Figure 2:
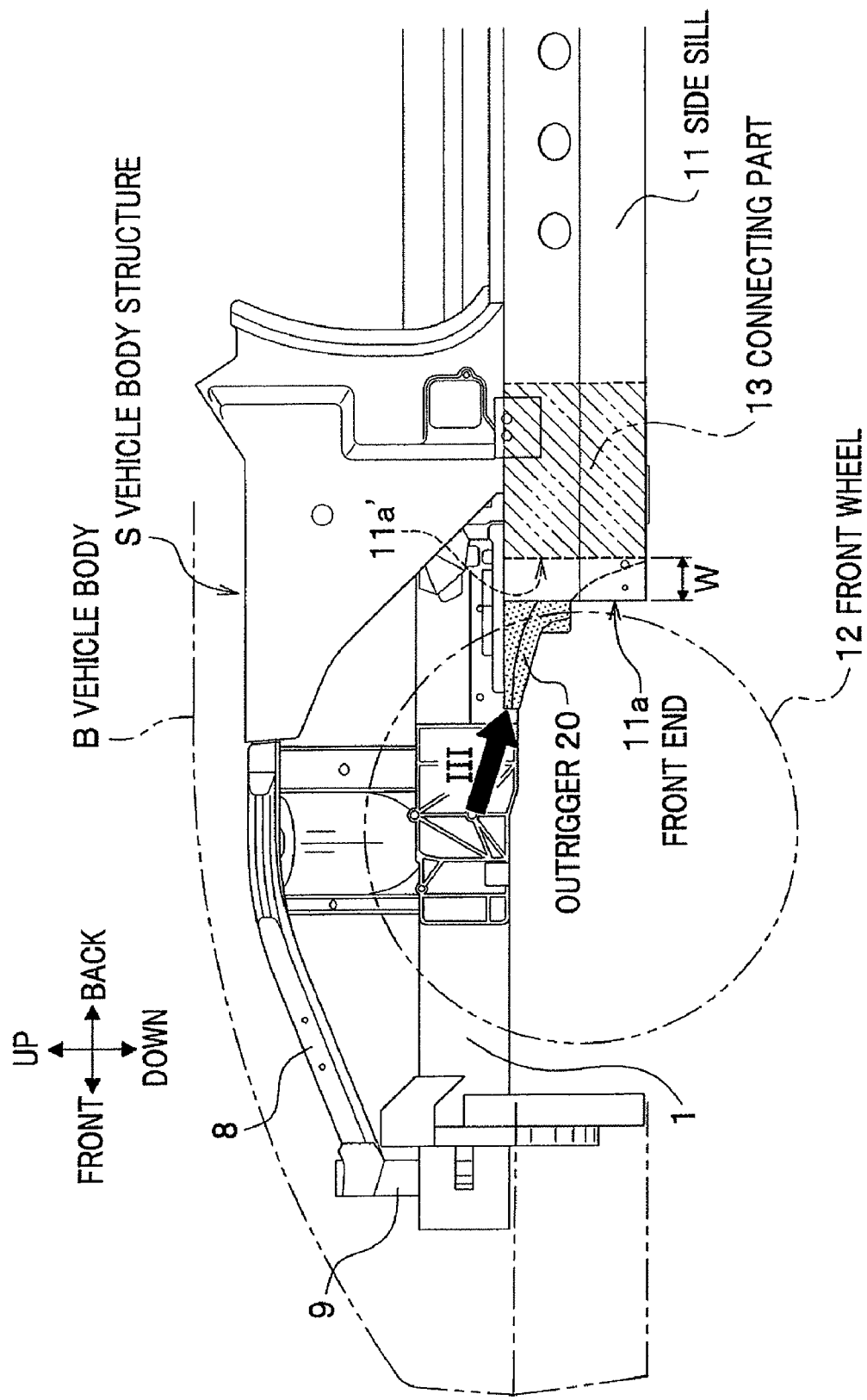
FIG. 2 is a left side view of the vehicle body structure shown in FIG. 1.
Figure 3:
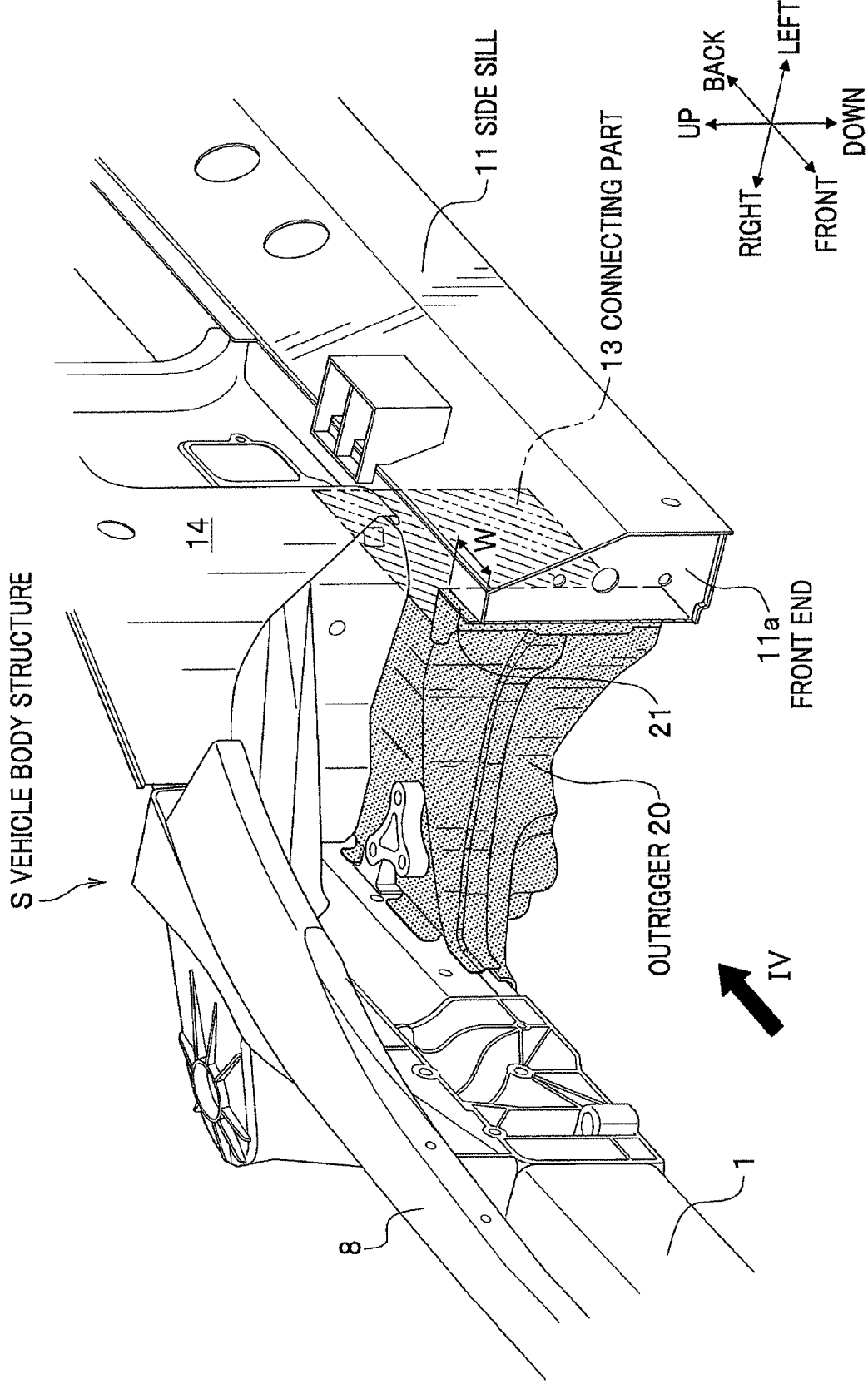
FIG. 3 is a perspective view showing a side sill and an outrigger seen in a direction III of FIG. 2.
Figure 4:
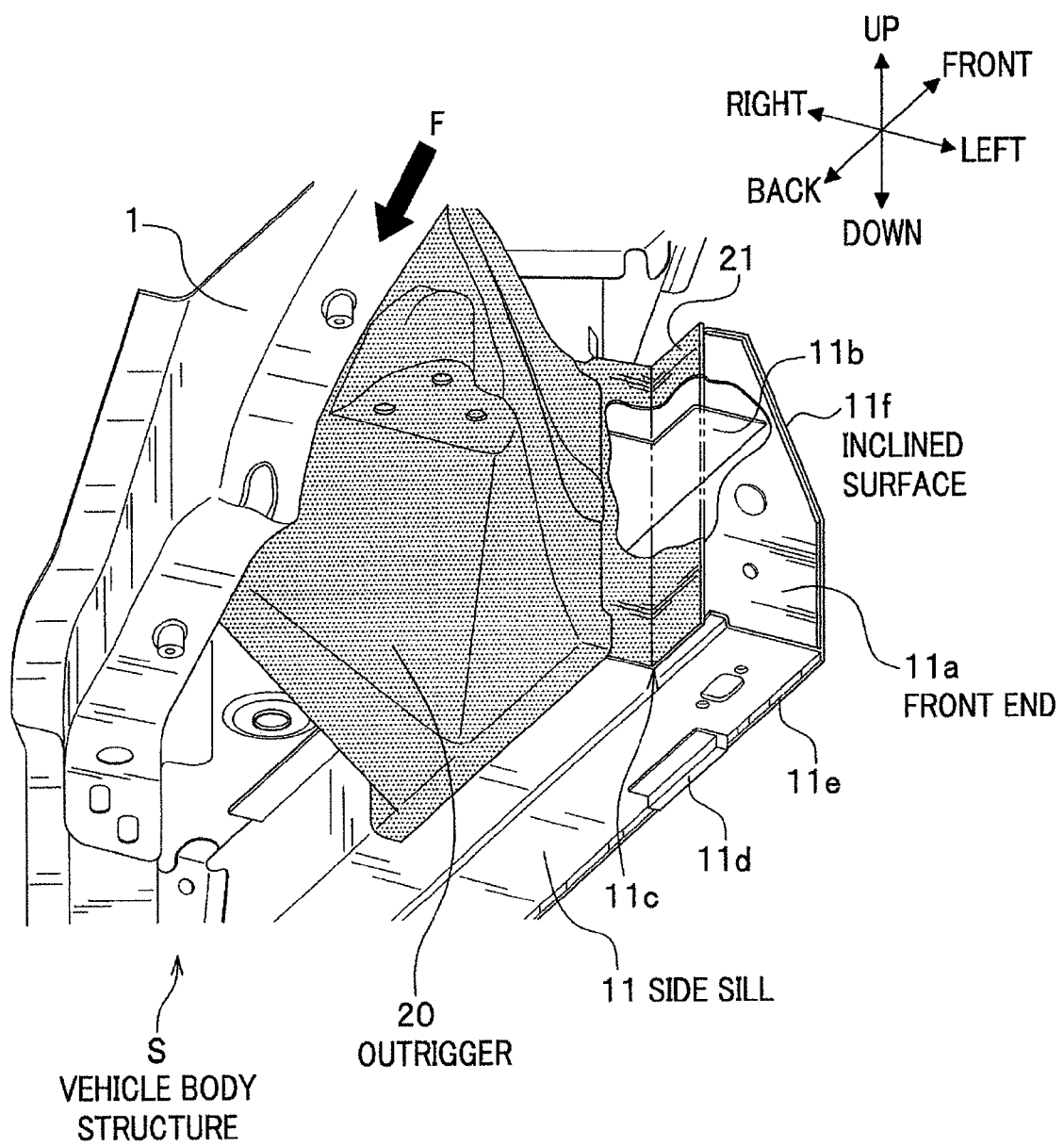
FIG. 4 is a perspective view showing the side sill and the outrigger seen in a direction IV of FIG. 3.

Embodiment of a vehicle body structure according to the present invention is described in detail with reference to the accompanying drawings as appropriate. FIG. 1 is a diagram of the vehicle body structure according to the embodiment showing a front part of a vehicle seen from the under side of the vehicle. FIG. 2 is a left side view of the vehicle body structure shown in FIG. 1. FIG. 3 is a perspective view showing a side sill and an outrigger seen in a direction III in FIG. 2. FIG. 4 is a perspective view showing the side sill and the outrigger seen in a direction IV in FIG. 3. It is to be noted that, in the following description, a front-back direction, an up-down direction and a right-left direction correspond to those of the vehicle to which the vehicle body structure is applied. More specifically, the front-back direction and the right-left direction in the following description correspond to those shown in FIG. 1, and the up-down direction in the following description corresponds to that shown in FIG. 2.

Generally, in a vehicle body structure of a vehicle, side sills are members that are provided on right and left sides of a vehicle body and extend in the front-back direction. Each side sill is connected to an outrigger that is provided on the rear end side of a front side frame.

A main characteristic of the vehicle body structure S according to the present invention is that the front end of the side sill 11, 11 is composed of an extruded material that extends frontward beyond the connecting part of the side sill 11, 11 and the outrigger 20, 20. Here, an overall configuration of the vehicle body structure S is firstly described before explaining the connection structure of the side sill 11, 11 and the outrigger 20, 20.

As shown in FIG. 1, a vehicle body structure S according to the embodiment includes front side frames 1, 1 disposed on the front side of a vehicle body B of a vehicle, outriggers 20, 20 connected to the rear end sides of the front side frames 1, 1 and side sills 11, 11 connected to the outriggers 20, 20.

The front side frames 1, 1 are provided on the right and left sides of the vehicle body B respectively, each of which extends in the front-back direction. Each front side frame 1 according to the embodiment is connected to a front bumper extension on the front side of the front side frame 1 and extends rearward. The front side frame 1 is bent outwardly toward a vehicle outer side on the rear end side thereof. The front ends of floor frames 2, 2 are connected to the rear ends of the front side frames 1, 1. The floor frames 2, 2 are disposed on the under side of a front floor panel 3 and reinforce the front floor panel 3. Each floor frame 2 extends toward the side sill 11 from the rear end side of the front side frame 1, and is connected to the side sill 11. A center tunnel 4 is formed at the central side of the front floor panel 3. A dashboard cross member 5 is disposed over the front side of the center tunnel 4 and is connected to the front side frames 1, 1 at both ends of the dashboard cross member 5. The dashboard cross member 5 is disposed adjacent to the lower end of a dashboard-lower not shown. A middle floor cross member 6 is connected to the rear end of the front floor panel 3. The middle floor cross member 6 is connected to the side sills 11, 11 at both ends of the middle floor cross member 6.

The front ends of the front side frames 1, 1 according to the embodiment are connected to each other via a bulkhead lower cross member 7. Upper members 8, 8 are also connected to the front sides of the front side frames 1, 1, respectively.

As shown in FIG. 2, the upper member 8 is connected to the front side of the front side frame 1 at the front end thereof via a bulkhead side stay 9. The upper member 8 extends obliquely upward toward the rear side of the vehicle.

The side sills 11, 11, the front side frames 1, 1, the middle floor cross member 6 and the upper members 8, 8 shown in FIG. 1 are composed of extruded aluminum material. The floor frames 2, 2, the front floor panel 3, the center tunnel 4 and the dashboard cross member 5 are respectively composed of pressed aluminum material. The outriggers 20, 20 are composed of cast aluminum.

In the vehicle body structure S according to the embodiment, a front wheel 12 is disposed below the upper member 8 as shown in FIG. 2. The front side frames 1, 1 are disposed at the vehicle inner side of the front wheels 12, 12 as shown in FIG. 1. The outriggers 20, 20 connected to the rear end sides of the front side frames 1, 1 extend obliquely rearward to the vehicle outer side from the front side frames 1, 1. The side sills 11, 11 are connected to the outriggers 20, 20, and the front end 11a of the side sill 11 is opposed to the front wheel 12 and protrudes frontward beyond the connecting part of the side sill and the outrigger 20 as shown in FIGS. 1 and 2. To be more specific, in the vehicle body structure S, the front end 11a of the side sill 11 protrudes frontward by a projection width W compared with the front end 11a' of the side sill in the conventional vehicle body structure as shown in FIG. 2.

Next, a connection structure of the outrigger 20 (see FIG. 1) and the side sill 11 (see FIG. 1) will be described. Since the connection structures of the right and left sides of the vehicle body B (see FIG. 1) have a symmetrical structure to each other, the description will be made only on the connection structure of the left side of the vehicle body B.

As shown in FIG. 3, the outrigger 20 of the embodiment and the front side frame 1 is connected by a commonly known connecting method, such as welding or the like. More specifically, the outrigger 20 is connected to the side sill by a commonly known connecting method, such as welding or the like in such a manner that the front end 11a of the side sill 11 protrudes frontward beyond the connecting part 13 by the projection width W. It is to be noted that the numerical symbol 8 indicates an upper member and the numerical symbol 14 indicates a dashboard lower in FIG. 3.

The outrigger 20 includes a flange 21 that extends toward the side sill 11. The flange 21 is formed of a plate that is L shaped in cross section, the shape corresponding to a recessed corner part 11c, which will be described later (see FIG. 4), provided in the side sill 11. The L-shaped flange 21 is engaged with the recessed corner part 11c of the side sill 11, which makes the connection strength of the outrigger 20 and the side sill 11 stronger.

As shown in FIG. 4, the side sill 11 is a hollow member and is composed of extruded aluminum, as described before. The side sill 11 also has an inclined surface 11f on the vehicle outer side thereof. The side sill 11a includes inside thereof a horizontal wall 11b that is made of a flat plate. The horizontal wall 11b is disposed on the inclined surface 11f and extends in the front-back direction. The horizontal wall 11b horizontally divides the inside of the side sill 11 and forms a closed cross section. The horizontal wall 11b enhances the rigidity of the side sill 11. With the horizontal wall 11b, the amount of collision energy to be absorbed can be controlled.

The side sill 11 has the recessed corner part 11c that is cut out in L shape at its front side on the vehicle inner side (right side in FIG. 4) thereof. The recessed corner part 11c is engaged with the flange 21 of the outrigger 20. An opening (not shown) formed on the front side of the side sill 11 made of the extruded material is covered by a plate member of a predetermined shape and forms the front end 11a. It is to be noted that the L shaped flange 21 of the outrigger 20 is disposed in such a manner that the flange 21 covers the recessed corner part 11c of the side sill 11. As a result, when the vehicle collides head-on, the collision load F is transmitted from the front side frame 1 to the side sill 11 via the flange 21 of the outrigger 20 that is engaged with the recessed corner part 11c.

The front side part of the side sill 11 having the recessed corner part 11c is smaller than the other parts of the side sill 11 in width. More specifically, the front side part of the side sill 11 having the recessed corner part 11c is designed to be weaker than the other parts of the side sill 11 in rigidity. As a result, when the front end 11a of the side sill 11 receives the front wheel 12 (see FIG. 1), the front side part of the side sill 11 is deformed more preferentially than the other parts of the side sill 11 and efficiently absorbs the collision energy.

According to the embodiment, a plate 11d for jack-up is provided on the bottom surface of the side sill 11. A rib 11e that protrudes bottomward is formed along the edge of the side sill 11 on the vehicle outer side of the side sill 11 (left side in FIG. 4). The rib 11e extends in the front-back direction of the side sill 11, and prevents a vehicle body B from coming in contact with a road surface, for example, when the vehicle body B (see FIG. 1) of the vehicle runs over a step of a road surface. The rib 11e also enhances the rigidity of the side sill 11.

Figure 5:
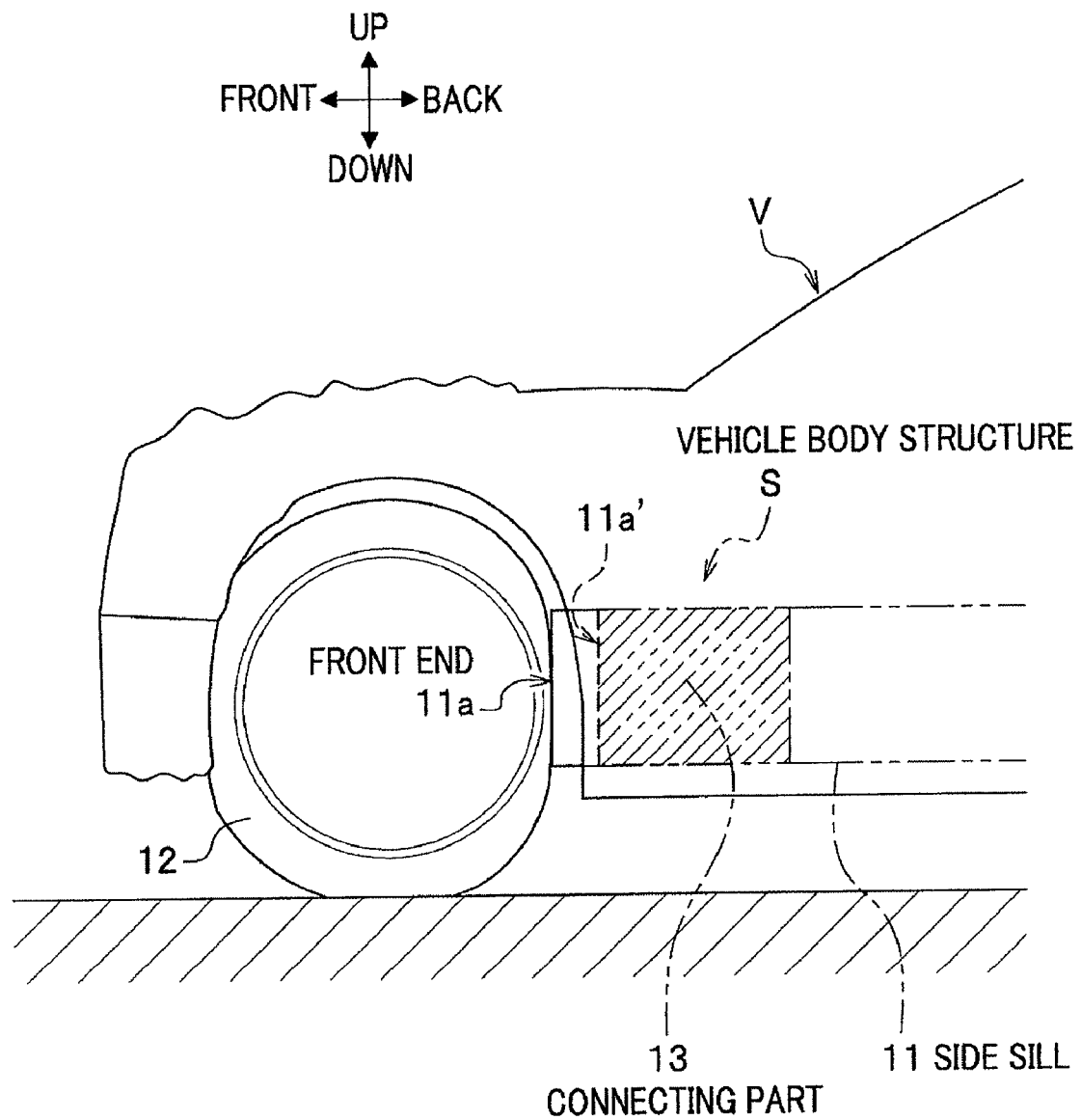

Next, effects of the vehicle body structure S are described. FIG. 5 is a left side view that shows the front side of a vehicle when the vehicle having the vehicle body structure S according to the embodiment collides head-on.

As shown in FIG. 5, the vehicle body structure S according to the embodiment is configured in such a manner that the front end 11a of the side sill 11 protrudes beyond the connecting part 13 of the outrigger 20 (see FIG. 1) and the side sill 11. Specifically, the front end 11a of the side sill 11 is disposed frontward beyond the front end 11a' of the conventional side sill, which allows the front end 11a of the side sill 11 to receive, at a position more front than conventional side sills, the front wheel 12 moving backward. In the vehicle body structure S according to the embodiment, a part that receives the front wheel 12 is integrally formed with the side sill 11 made of extruded material, which is different from a conventional vehicle body structure (see Unexamined Japanese Patent Application Publication No. 2007-45352, for example) in which the load absorbing means receive the front wheel. In the vehicle body structure S according to the embodiment, because the side sill 11 itself receives the front wheel 12, it is possible to prevent the front wheel 12 from moving backward and to absorb the collision energy at the front end 11a of the side sill 11 even when the vehicle V collides head on in a high speed.

As a result, in contrast to a conventional vehicle body structure (refer to Unexamined Japanese Patent Application Publication No. 2007-45352, for example), a risk can be also reduced in the vehicle body structure S that the front wheel 12 deforms the front floor panel 3 (see FIG. 1) disposed inside (vehicle inner side) of the side sill 11 since the vehicle body structure S prevents the front wheel 12 from moving backward even when the vehicle V crashes head on in a high speed.

Furthermore, in contrast to a conventional vehicle body structure (see Unexamined Japanese Patent Application Publication No. 2007-45352, for example), the side sill 11 does not have to be reinforced in the vehicle body structure S according to the embodiment, since the front end 11a of the side sill 11 absorbs the collision energy efficiently even when the vehicle V collides head-on in a high speed. Thus, in the vehicle body structure S according to the embodiment, weight increase due to reinforcement can also be avoided because the side sill 11 does not have to be reinforced.

Moreover, in contrast to a conventional vehicle body structure (see Unexamined Japanese Patent Application Publication No. 2007-45352, for example), load absorbing means do not have to be provided in the vehicle body structure S according to the embodiment, since the front end 11a of the side sill 11 receives the front wheel 12. Thus, in the vehicle body structure S according to the embodiment, there is no risk of decreasing rigidity of the vehicle body B due to thermal strain that is caused when the load absorbing means are fixed by welding in a conventional vehicle body structure (see Unexamined Japanese Patent Application Publication No. 2007-45352, for example). In the vehicle body structure S according to the embodiment, there is no weight increase of the vehicle body that is caused by mechanically fastening the load absorbing means with bolts and the like.

Further, in contrast to a conventional vehicle body structure (see Unexamined Japanese Patent Application Publication No. 2007-45352, for example), the side sill 11 does not have to be reinforced and load absorbing means do not have to be provided either in the vehicle body structure S according to the embodiment, which results in the reduction in manufacturing cost.

Though the vehicle body structure S according to the embodiment is a simple structure, the vehicle body structure S can prevent the front wheel from moving backward even when a vehicle collides head-on in a high speed. The vehicle body structure S according to the embodiment also provides a lighter weighted vehicle body structure having higher rigidity.

The present invention is not limited to the above embodiment, and may be implemented in various embodiments.

In the embodiment, the side sill 11 includes inside thereof the horizontal wall 11b, however, the present invention is not limited to this, and the side sill 11 may include a vertical wall or an oblique wall as long as the wall is a plate that divides the inside of the side sill 11. The vehicle body structure of the present invention may not necessarily include the wall that divides the inside of the side sill 11, and may include a rib that is provided in the side sill 11 and extends in the front-back direction.

In the embodiment, the flange 21 of the outrigger 20 is engaged with the recessed corner part 11c of the side sill 11, however, the present invention is not limited to this, and the connecting part 13 of the outrigger 20 and the side sill 11 may be formed at the recessed corner part 11c while ensuring the projection width W.

The outrigger 20 may be gradually widened in the up-down direction toward the side sill 11 so that the height of the outrigger 20 is increased to be equal to that of the side sill 11. This configuration enables to enhance the rigidity of the side sill 11, which makes the front end 11a be deformed preferentially.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A vehicle body structure comprising:
   at least one side sill and at least one outrigger, the at least one side sill being connected to the at least one outrigger, wherein the at least one side sill is made of an extruded material and has a front end portion protruding frontward from a connecting portion between the at least one side sill and the at least one outrigger, and the at least one side sill has a recessed corner part that is cut out in an L shape at the front end portion of the side sill.

2. A vehicle body structure comprising:
   at least one side sill and at least one outrigger, the at least one side sill being connected to the at least one outrigger, wherein the at least one side sill is made of an extruded material and has a front end portion protruding frontward from a connecting portion between the at least one side sill and the at least one outrigger, the at least one side sill has an inclined surface on a vehicle outer side thereof, and a horizontal wall is provided on the inclined surface.

3. A vehicle body structure comprising:
   at least one side sill and at least one outrigger, the at least one side sill being connected to the at least one outrigger, wherein the at least one side sill is made of an extruded material and has a front end portion protruding frontward from a connecting portion between the at least one side sill and the at least one outrigger, and a height level of the at least one outrigger is gradually increased in an up-down direction toward the at least one side sill so that the height level of the at least one outrigger becomes equal to a height level of the at least one side sill.

4. The vehicle body structure according to claim 1, wherein the at least one outrigger comprises an L-shaped flange that corresponds to a shape of the recessed corner part.

5. The vehicle body structure according to claim 1, wherein the at least one side sill has an inclined surface on a vehicle outer side.

6. The vehicle body structure according to claim 1, wherein a height level of the at least one outrigger is gradually increased in an up-down direction toward the at least one side sill so that the height level of the at least one outrigger becomes equal to a height level of the at least one side sill.

7. The vehicle body structure according to claim 2, wherein the at least one side sill has a recessed corner part that is cut out in an L shape at the front end portion of the side sill.

8. The vehicle body structure according to claim 2, wherein a height level of the at least one outrigger is gradually increased in an up-down direction toward the at least one side sill so that the height level of the at least one outrigger becomes equal to a height level of the at least one side sill.

9. The vehicle body structure according to claim 3, wherein the at least one side sill has a recessed corner part that is cut out in an L shape at the front end portion of the side sill.

10. The vehicle body structure according to claim 3, wherein the at least one side sill has an inclined surface on a vehicle outer side.

* * * * *